(12) United States Patent
Li et al.

(10) Patent No.: US 7,823,794 B2
(45) Date of Patent: Nov. 2, 2010

(54) STRIPLINE MAGNETIC WRITING OF DYNAMIC MAGNETIC DATA BITS IN SURROUNDING REGIONS OF STATIC MAGNETIC DATA BITS

(75) Inventors: Weidong Li, Fremont, CA (US); Edgar M. Williams, Palo Alto, CA (US)

(73) Assignee: Qsecure, Inc., Los Altos, CA (US)

( * ) Notice: Subject to any disclaimer, the term of this patent is extended or adjusted under 35 U.S.C. 154(b) by 378 days.

(21) Appl. No.: 11/955,365

(22) Filed: Dec. 12, 2007

(65) Prior Publication Data

US 2009/0152365 A1 Jun. 18, 2009

(51) Int. Cl.
*G06K 19/06* (2006.01)
*G06K 7/08* (2006.01)

(52) U.S. Cl. .................... 235/493; 235/492; 235/449

(58) Field of Classification Search ............... 235/492, 235/493, 486, 487, 449, 380, 382, 375
See application file for complete search history.

(56) References Cited

U.S. PATENT DOCUMENTS

| 7,591,426 B2 * | 9/2009 | Osterweil et al. | 235/449 |
| 2006/0283958 A1 * | 12/2006 | Osterweil | 235/492 |
| 2008/0201264 A1 * | 8/2008 | Brown et al. | 705/67 |
| 2008/0319901 A1 * | 12/2008 | Brown | 705/41 |
| 2009/0152365 A1 * | 6/2009 | Li et al. | 235/493 |

\* cited by examiner

*Primary Examiner*—Thien M Le
(74) *Attorney, Agent, or Firm*—Dana Legal Services

(57) ABSTRACT

A magnetic device that includes a magnetic stripe for recording a combination of dynamic and static magnetic data. The magnetic stripe includes at least two regions of material with substantially different coercivities. One region contains static information and the other can be re-written with dynamic information.

14 Claims, 3 Drawing Sheets

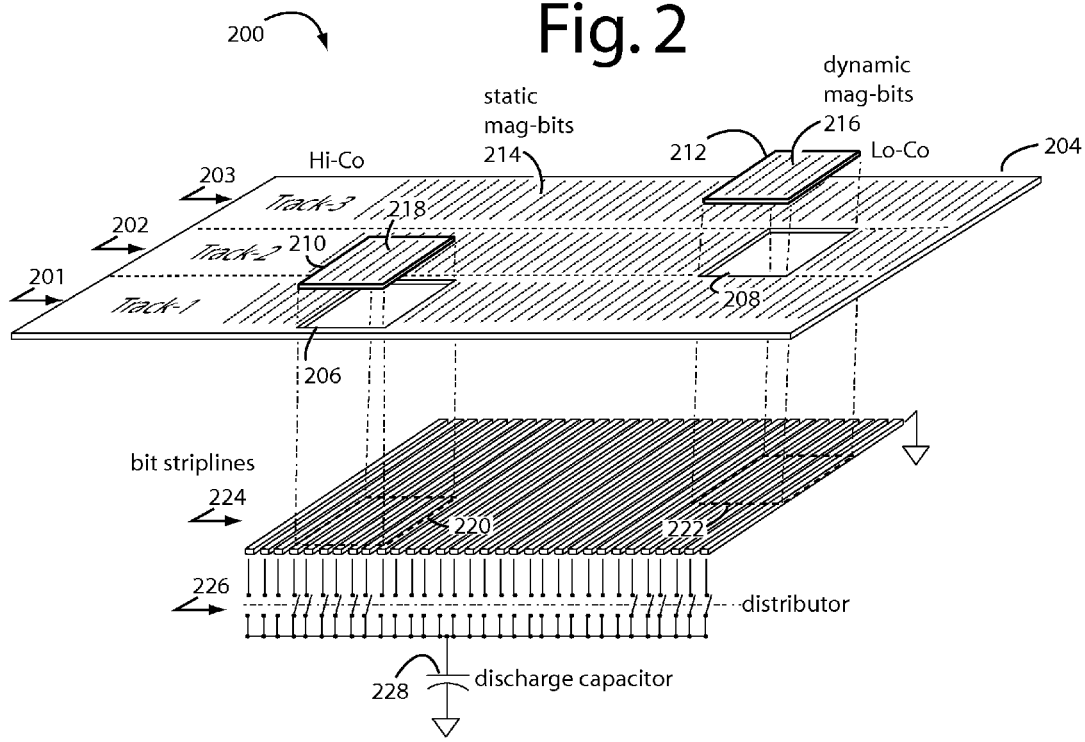
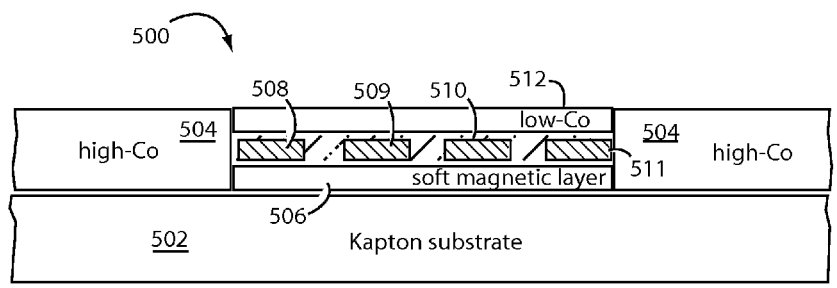

STRIPLINE MAGNETIC WRITING OF DYNAMIC MAGNETIC DATA BITS IN SURROUNDING REGIONS OF STATIC MAGNETIC DATA BITS

BACKGROUND OF THE INVENTION

1. Field of the Invention

The present invention relates to magnetic data recording, and in particular to devices and methods for equipping payments cards with magnetic stripes that can autonomously reprogram some of the magnetic data bits recorded.

2. Description of Related Art

Magnetic information storage medias need to retain their data despite thermal fluctuations caused by the superparamagnetic limit. If the thermal energy is too high, the magnetic data stored will be lost. The energy required to reverse the magnetization of a storage medium is proportional to the size of the magnetic field and the magnetic coercivity of the material of the medium. A higher coercivity medium is inherently more stable thermally. Stability is proportional to the product of bit, or magnetic grain volume, times the uniaxial anisotropy constant Ku, which is higher for materials with higher magnetic coercivity.

SUMMARY OF THE INVENTION

Briefly, magnetic device embodiment of the present invention comprises a magnetic stripe for recording a combination of dynamic and static magnetic data. The magnetic stripe comprises at least two regions of material with substantially different coercivities. A first of these regions includes a relatively high coercivity material into which the static magnetic data will be originally recorded by a relatively strong magnetic recording head external to the magnetic device. An array of bit striplines underlies a second of the two regions of material with relatively low coercivity, and is able to produce magnetic fields sufficient to write the dynamic magnetic data in such low coercivity material. The bit stripline may also underlie the first region of relatively high coercivity material, but the magnetic fields it can generate are not strong enough to affect the static magnetic data. The bit stripline is built up from many parallel sections of conductor. A capacitor is charged to a voltage high enough to generate a current through each bit stripline switched on one at a time. The current pulses through each stripline conductor section produce magnetic writing pulses to the adjacent second region of low coercivity material. Thus new data can be written to the dynamic magnetic data. An external reader will thereafter be able to read out a combination of the dynamic and static magnetic data.

An advantage of the present invention is that a magnetic device is provided that significantly reduces the recurring manufacturing costs of payment cards equipped with dynamic magnetic stripes.

Another advantage of the present invention is that a method is provided for recording magnetic data in a magnetic stripe.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 2 is an exploded assembly diagram of a second magnetic device embodiment of the present invention which has two separate active areas of a three track magnetic stripe;

FIG. 5 is a cross-section of a magnetic device embodiment of the present invention like those of FIGS. 1-4, but where a soft magnetic layer has been disposed under the stripline array to reduce the writing currents needed to program dynamic magnetic data bits in the relatively low-coercivity material above it.

DETAILED DESCRIPTION OF THE INVENTION

Figure 1:
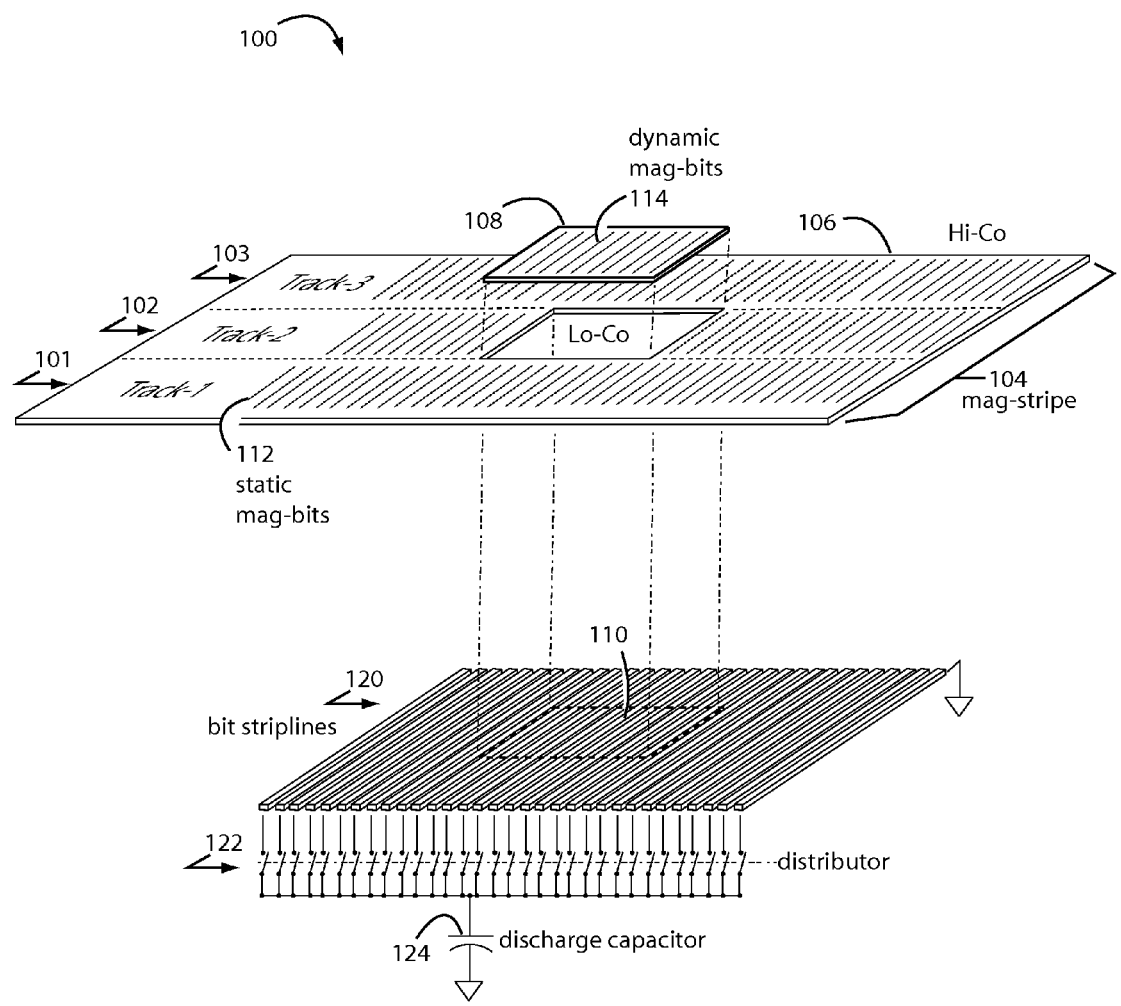
FIG. 1 is an exploded assembly diagram of a first magnetic device embodiment of the present invention which has a single active area located in Track-2 of a three track magnetic stripe.

FIG. 1 represents a magnetic device embodiment of the present invention, and is referred to herein by the general reference numeral 100. Such magnetic device 100 would be very useful if installed in a magnetic-stripe type payment card.

Magnetic device 100 comprises three recording tracks (Track-1) 101, (Track-2) 102, and (Track-3) 103, all arranged on a magnetic stripe 104. The example of three tracks presented here is merely to demonstrate how magnetic device 100 would fit in a payment card, especially QSecure, Inc. (Los Altos, Calif.) SMARTSTRIPE™ cards that include QCHIP™ and QSTRIP™ semiconductor devices.

The magnetic stripe 104 comprises at least two regions of material with substantially different coercivities. A first region 106 includes a relatively high coercivity (high-Co) material, and a smaller second region 108 of relatively low coercivity (low-Co) material is inserted into the Track-2 102 data region overlying an active area 110. In one application, the relatively high coercivity material has an Hc of about 3500 Oe. In one embodiment, the relatively low coercivity material has an Hc of about 150 Oe. Such magnetic stripe 104 provides for recording a combination of static magnetic data 112 and dynamic magnetic data 114.

A bit striplines array 120 is able to produce magnetic fields sufficient to write the dynamic magnetic data 114 in such low coercivity material 108 throughout active area 110. The bit stripline may also underlie the relatively high coercivity material 106, but the magnetic fields it can generate are not strong enough to affect the static magnetic data 112. The bit stripline is built up from many parallel sections of conductor all switched by a distributor 122. A capacitor 124 is charged to a voltage high enough to generate a current through each bit stripline, switched on one at a time. The current pulses through each stripline conductor section produce magnetic writing pulses to the adjacent low coercivity material 108. Thus new data can be written to the dynamic magnetic data 114. An external reader will thereafter be able to read out a combination of the dynamic magnetic data 114 and static magnetic data 112.

Constituent striplines in the bit striplines array 120 comprise copper (Cu), gold (Au), aluminum (Al), or metal alloys with good conductive properties. They are preferably rectangular in lateral cross-section, in the range of 50-160 micrometers (μm) wide, less than fifteen micrometers tall, and spaced 5-20 μm apart. Each stripline section is presently estimated to require six amp current pulses, 10-15 nanoseconds (ns) in width. So the supply lines, switches, and power sources, are such that their parasitic and stray capacitances, inductances, and resistances are controlled to limit magnetic field generation substantially to the striplines themselves.

One important way that the adverse affects of stray magnetic fields coming from the switches, power sources, and power distribution lines on dynamic bits 114 can be limited, is to locate such components well away from the active area 110. They can be safely positioned or routed under the high coercivity material 106. The static data bits 112 cannot be altered by such stray magnetic fields. Only the striplines themselves are in the active area 110 and are therefore able to operate on the dynamic data bits 114.

FIG. 2 represents a second magnetic device embodiment of the present invention that provides for two separate active areas in a magnetic stripe, and is referred to herein by the general reference numeral 200. Such magnetic device 200 can be used to improve payment card security by providing use-once account numbers and/or card verification values.

Magnetic device 200 comprises three ISO-type recording tracks (Track-1) 201, (Track-2) 202, and (Track-3) 203, all arranged on a magnetic stripe 204. The magnetic stripe 204 comprises a relatively high coercivity material, with rectangular holes 206 and 208 providing for the insertion of relatively low coercivity material 210 and 212. These are respectively inserted into the Track-1 201 and Track-2 202 data regions. Static magnetic data bits 214 are recorded in the three tracks 201-203 by an external high energy writing head when device 200 is first put into use.

Dynamic magnetic data bits 216 are recorded and re-recorded during operation by active areas 220 and 222 on a bit stripline array 224. The magnetic fields delivered by bit stripline array 224 are insufficient to alter static magnetic data bits 214. A distributor 226 includes only those switches necessary to operate constituent striplines in the active areas 220 and 222. A reversible capacitor 228 is used to build up a sufficient charge plus or minus from a charge pump that increases battery voltage to produce a large enough pulse of current through constituent striplines in the active areas 220 and 222 to write the corresponding dynamic magnetic data bits 216 as "ones" and "zeroes".

The pitch between constituent striplines in bit stripline array 224 need not be uniform throughout the entire length. For example, it may be advantageous to have one pitch in active area 220 that produces 210-bpi, and another pitch in active area 222 that produces 75-bpi. The labeling of Track-1, Track-2, and Track-3, in FIGS. 1 and 2 is arbitrary, in credit card applications mean to be compatible with industry standards, the industry may actually refer to these by different labels.

The length, number, and width of the constituent striplines shown in the stripline array 120 and 224 of FIGS. 1 and 2 are not meant to be proportional nor like particular applications. The heavy return lines and routing outside the active areas 110, 220, and 222, are not shown, but nevertheless important to controlling stray magnetic fields that can affect the dynamic magnetic bits. In general, the return paths, supply rails, and power planes would be routed under the high-Co materials, 2-4 millimeters away from the low-Co active areas.

A corresponding method embodiment of the present invention positions a planar bit stripline array proximate to a planer deposit of magnetically writable and readable recording material. The recording material comprises at least one area of relatively high coercivity material, and at least one area of relatively low coercivity material. An external magnetic data writer is used to record static data bits in the relatively high coercivity material. Current pulses are sent through individual striplines in the planar bit stripline array to thereafter record and re-record dynamic data bits in the relatively low coercivity material. The magnetic fields produced by such current pulses sent through the individual striplines in the planar bit stripline array are not strong enough to change the original recording of the static data bits.

In general, magnetic device embodiments of the present invention can be usefully applied in all three tracks in magnetic stripe payment cards. FIG. 1 shows an example of a Track-2 application, and FIG. 2 shows an application that uses both Track-1 and Track-2.

Conventional magnetic stripe payment cards use different recording densities for Track-2, compared with Track-1 and Track-3. For Track-1 and Track-3 credit card and debit card applications, the stripline pitch should be about 60.5 μm, for 210 bits-per-inch (bpi), or some whole multiple of 210-bpi. For Track-2 applications, the stripline pitch should be about 170 μm (75-bpi) or some whole multiple of 75-bpi. Other application that could be expected would require 150-bpi, which is a stripline pitch of about 85 μm.

If the necessary driving current were twelve amps for a given single stripline with 170 μm pitch (75-bpi), and if the actual pitch of a particular stripline array is half that, 85 μm, it is possible to use a six amp current driven in two adjacent two striplines.

Low coercivity materials 210 and 212 should have coercivity less than 350 Oe, and reasonable magnetic squarenesss, e.g., larger than 0.6. The magnetic thickness of the medium should be in the range of 80-140 memu per square cm, to match ISO readback signal requirement. Physical thickness should be thinner than ten micrometers.

The minimum driving current is related to the medium properties and recording density. For example, if medium Hc of 150 Oe and stripline pitch of 60.5 μm are used for 210-bpi recording density for Track-1 or Track-3 application, then the current pulse peak will be of the order of 4.5 amps. In general, a peak driving current of 2-12 amps, and pulse width shorter than fifty nanoseconds should satisfy all the applications.

Space distribution of the driving current affects performance. All the return paths should only be routed close to the high coercivity (Hc>2500 Oe) medium area, and far away form the low coercivity medium, which is the dynamic area. Driving current is strong enough to switch the low coercivity medium above the striplines. However, the magnetic field generated by the return paths is not strong enough to affect the magnetic information on high-coercivity medium area.

Figure 3:
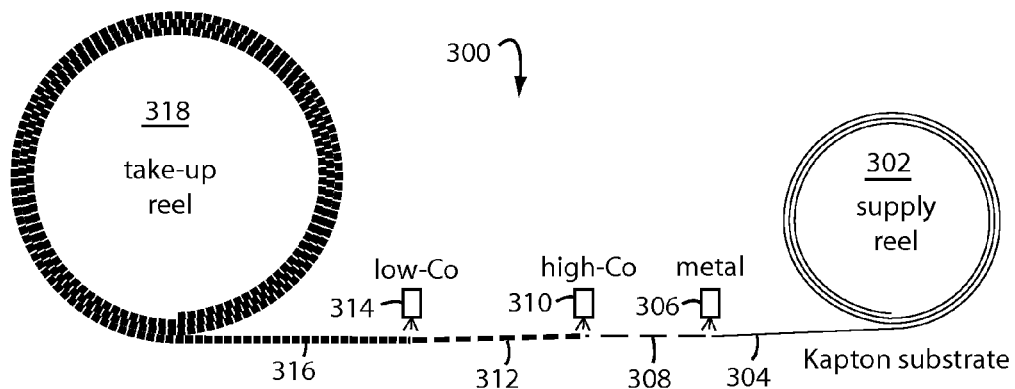
FIG. 3 is a diagram representing a continuous manufacturing method for making the magnetic devices shown in FIGS. 1 and 2.

FIG. 3 represents a continuous manufacturing method embodiment of the present invention, and is referred to herein by the general reference numeral 300. Method 300 could be advantageously used for making the magnetic devices shown in FIGS. 1 and 2. A supply reel 302 provides a continuous feed of plastic sheet material that serves as a substrate or laminate for a payment card. For example, a KAPTON [poly(4,4'-oxydiphenylene-pyromellitimide)] substrate 304 passes under a jet 306 for depositing metal in the stripline arrays shown in FIGS. 1 and 2. The result is an intermediate 308. Inkjet technology, metal sputtering, and other semiconductor thin-film process techniques can be used. Any necessary intermediate and insulating layer deposits and masking are not shown here to keep this discussion simple and easy to follow. A high coercivity jet 310 adds high-Co material, e.g., 106 (FIG. 1) and 204 (FIG. 2) to intermediate 308. A second intermediate 312 is ready to receive the material that will eventually hold the dynamic data bits (114, 216, 218). A low coercivity jet 314 adds low-Co material, e.g., 108 (FIG. 1) and 210-212 (FIG. 2) to the second intermediate 312. A finished prelaminate 316 is ready to be wound up on a take-up reel 318. Such is sent on to a secure card manufacturing center for finishing into personalized payment cards.

Figure 4:
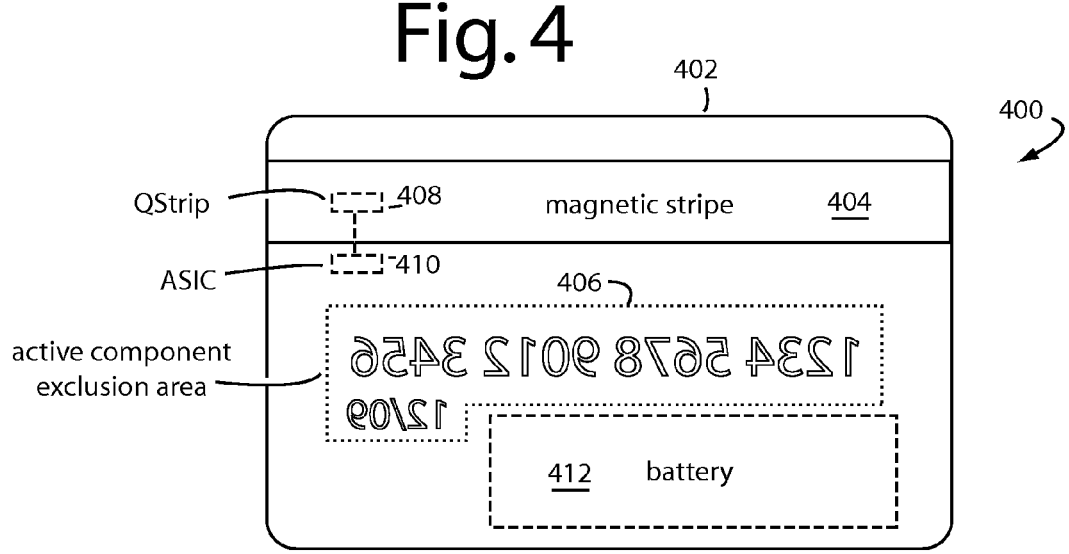
FIG. 4 is a reverse side diagram of a typical magnetic-stripe payment card that could be inexpensively manufactured using the magnetic devices of FIGS. 1 and 2 and the manufacturing method of FIG. 3.

FIG. 4 represents a typical magnetic-stripe payment card 400 that could be inexpensively manufactured using the magnetic devices 100 and 200 of FIGS. 1 and 2, and the manufacturing method 300 of FIG. 3. Payment card 400 includes a credit-card sized plastic core 402 with a magnetic strip 404. A card embossing area 406 represents an exclusion area in which active components would be damaged during manufacturing by an account number embossing. A QStrip device 408, like magnetic devices 100 and 200, is embedded within and controlled by an application specific integrated circuit (ASIC) 410. Such ASIC 410 and a battery 412 to operate it must be placed outside the card embossing area 406.

QStrip device 408, representing the active portion of a magnetic device 100 or 200, can be placed anywhere in magnetic stripe 404. For example, in what would be the conventional Track-1, Track-2, or Track-3 areas. ASIC 410 would be positioned nearby at a convenient spot next to the magnetic strip 404.

FIG. 5 represents a magnetic device 500 that would require less writing current through the stripline array to record and re-record the dynamic data bits. Magnetic device 500 comprises a Kapton substrate 502 on which has been deposited a high-coercivity material 504 for the recording of static magnetic bits. What is different from devices 100 and 200 is a soft magnetic layer 506 which is disposed underneath an array of striplines 508-511. Such helps concentrate and focus magnetic fields being directed to write dynamic data bits in a low-coercivity layer 512 above. It is estimated that substantially less current would be needed to program each bit, compared with devices 100 and 200.

In one embodiment, the soft magnetic layer 506 is six micrometers thick of $Ni_{80}Fe_{20}$ permalloy film. Film thickness in various applications could be in the range of 3-20 μm, depending on the saturation magnetization and the driving current. Maxwell simulations indicate such a film may significantly improve the magnetic field distribution in the medium plane.

Although particular embodiments of the present invention have been described and illustrated, such are not intended to limit the invention. Modifications and changes will no doubt become apparent to those skilled in the art, and it was intended that the invention only be limited by the scope of the appended claims.

The invention is claimed, as follows.
The invention claimed is:

1. A magnetic data recording device, comprising:
   a planar magnetic stripe providing for magnetic data recording:
   a relatively high-coercivity material constituting a section of the planar magnetic stripe and providing for storage of static magnetic data bits;
   a relatively low-coercivity material constituting another different section of the planar magnetic stripe and providing for storage of dynamic magnetic data bits; and
   a stripline array underlying the planar magnetic stripe and providing for the recording and re-recording of said dynamic magnetic data bits;
   wherein said static magnetic data bits can not be altered by electrical currents passing through the stripline array or its supply sources during a recording or re-recording of said dynamic magnetic data bits.

2. The magnetic data recording device of claim 1, further comprising:
   a soft magnetic layer underlying the stripline array, wherein required writing currents for said dynamic magnetic data bits are reduced.

3. The magnetic data recording device of claim 1, wherein:
   the relatively high-coercivity material constituting a section of the planar magnetic stripe is such that an external writer must be used to initial program said static magnetic data bits.

4. The magnetic data recording device of claim 1, wherein:
   the planar magnetic stripe provides for side-by-side parallel tracks of magnetic data recording and reading;
   the stripline array underlies more than one of said side-by-side parallel tracks of magnetic data recording and reading;
   individual sections of said relatively low-coercivity material are aligned with and traverse only one of said side-by-side parallel tracks of magnetic data recording and reading; and
   said static data bits in adjacent parallel tracks of magnetic data recording and reading remain unaltered by electrical activity beneath them in the stripline array.

5. The magnetic data recording device of claim 1, wherein:
   the stripline array provides for at least one of 75, 150, and 210 bits-per-inch for said dynamic data bits.

6. The magnetic data recording device of claim 1, wherein:
   the stripline array provides for at least one of 60.5 μm, 85 μm, and 170 μm pitch between constituent stripline sections.

7. The magnetic data recording device of claim 1, further comprising:
   a switching and power supply source for providing current pulses to the stripline array to record or re-record said dynamic magnetic data bits, wherein components of such are positioned further away from said relatively low-coercivity material than said relatively high-coercivity material.

8. The magnetic data recording device of claim 1, wherein:
   the relatively low-coercivity material has a coercivity less than 350 Oe, and magnetic squarenesss larger than 0.6, and a magnetic thickness in the range of 80-140 memu per square centimeter, and a physical thickness less than ten micrometers.

9. The magnetic data recording device of claim 1, wherein:
   the relatively low-coercivity material has a coercivity of about 150 Oe, and the relatively high-coercivity material has a coercivity of more than 2500 Oe.

10. A method for inexpensively manufacturing a magnetic data recording device, comprising:
    moving a continuous roll of plastic substrate material sheeting between a supply reel and a take-up reel;
    depositing metal on said plastic substrate material sheeting between said reels to form a stripline array for individual magnetic recording devices;
    depositing over said stripline array a relatively high-coercivity material constituting a section of a planar magnetic stripe and providing for storage of static magnetic data bits; and
    depositing in openings in said relatively high-coercivity material a relatively low-coercivity material constituting another different section of said planar magnetic stripe and providing for storage of dynamic magnetic data bits;

wherein said deposits are such that said static magnetic data bits can not be altered during operation by electrical currents passing through said stripline array or its supply sources during a recording or re-recording of said dynamic magnetic data bits.

11. The method of claim 10, further comprising:
depositing said metal for said stripline array such that the pitch between constituent striplines suits a particular magnetic bits-per-inch requirement for magnetic recordings in said planar magnetic stripe.

12. The method of claim 10, further comprising:
depositing said metal for said stripline array such that the pitch between constituent striplines is different in at least two areas, and each suits a particular magnetic bits-per-inch requirement for magnetic recordings in corresponding parts of said planar magnetic stripe.

13. The method of claim 10, further comprising:
depositing a soft magnetic layer first to underlay said stripline array, wherein required writing currents for said dynamic magnetic data bits are reduced.

14. A payment card, comprising:
a plastic card;
a planar magnetic stripe providing for magnetic data recording:
a relatively high-coercivity material constituting a section of the planar magnetic stripe and providing for storage of static magnetic data bits;
a relatively low-coercivity material constituting another different section of the planar magnetic stripe and providing for storage of dynamic magnetic data bits; and
a stripline array underlying the planar magnetic stripe and providing for the recording and re-recording of said dynamic magnetic data bits;
an application specific integrated circuit (ASIC) for driving the stripline array and providing the data needed to record and re-record said dynamic magnetic data bits;
a battery for powering the ASIC; and
an exclusion area reserved for account number embossing in which the planar magnetic stripe, stripline array, ASIC, and battery are not allowed to be located;
wherein the exclusion area, planar magnetic stripe, stripline array, ASIC, and battery are all disposed on the plastic card.

* * * * *